United States Patent
Weiss

(10) Patent No.: US 6,615,785 B2
(45) Date of Patent: Sep. 9, 2003

(54) METHOD AND ARRANGEMENT FOR CONTROLLING THE RPM OF A DRIVE UNIT

(75) Inventor: Ruediger Weiss, Moetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/962,204

(22) Filed: Sep. 26, 2001

(65) Prior Publication Data

US 2002/0062814 A1 May 30, 2002

(30) Foreign Application Priority Data

Sep. 26, 2000 (DE) .......................... 100 47 502

(51) Int. Cl.$^7$ ............................................. F02N 17/00
(52) U.S. Cl. .................................. 123/179.28; 123/179.3
(58) Field of Search ......................... 123/179.3, 179.28, 123/320, 339.11, 339.19; 180/65.2, 65.3, 65.4; 290/46, 34, 35, 41, 40 A

(56) References Cited

U.S. PATENT DOCUMENTS

| | | | | |
|---|---|---|---|---|
| 5,115,183 A | * | 5/1992 | Kyoukane et al. | .......... 320/123 |
| 5,785,138 A | * | 7/1998 | Yoshida | ...................... 180/65.2 |
| 6,035,626 A | * | 3/2000 | Wahl et al. | .................... 60/773 |
| 6,102,144 A | * | 8/2000 | Lutz | ........................... 180/65.2 |
| 6,202,776 B1 | * | 3/2001 | Masberg et al. | ............ 180/65.2 |
| 6,425,839 B1 | * | 7/2002 | Koelle et al. | ................ 475/149 |
| 6,453,863 B1 | * | 9/2002 | Pels et al. | .................. 123/179.3 |

FOREIGN PATENT DOCUMENTS

| | | |
|---|---|---|
| DE | 197 39 567 | 3/1999 |
| DE | 198 42 496 | 3/2000 |
| DE | 199 39 821 | 2/2001 |

* cited by examiner

Primary Examiner—Mahmoud M Gimie
(74) Attorney, Agent, or Firm—Walter Ottesen

(57) ABSTRACT

The invention is directed to a method and an arrangement for controlling the rpm of a drive unit. During run-up of the engine to idle after start, a desired rpm is pregiven and an actual rpm is detected for forming the course of rpm. An electric machine is driven in dependence upon the deviation between the desired rpm and the actual rpm. With respect to the engine, the electric machine outputs braking and driving torques.

14 Claims, 3 Drawing Sheets

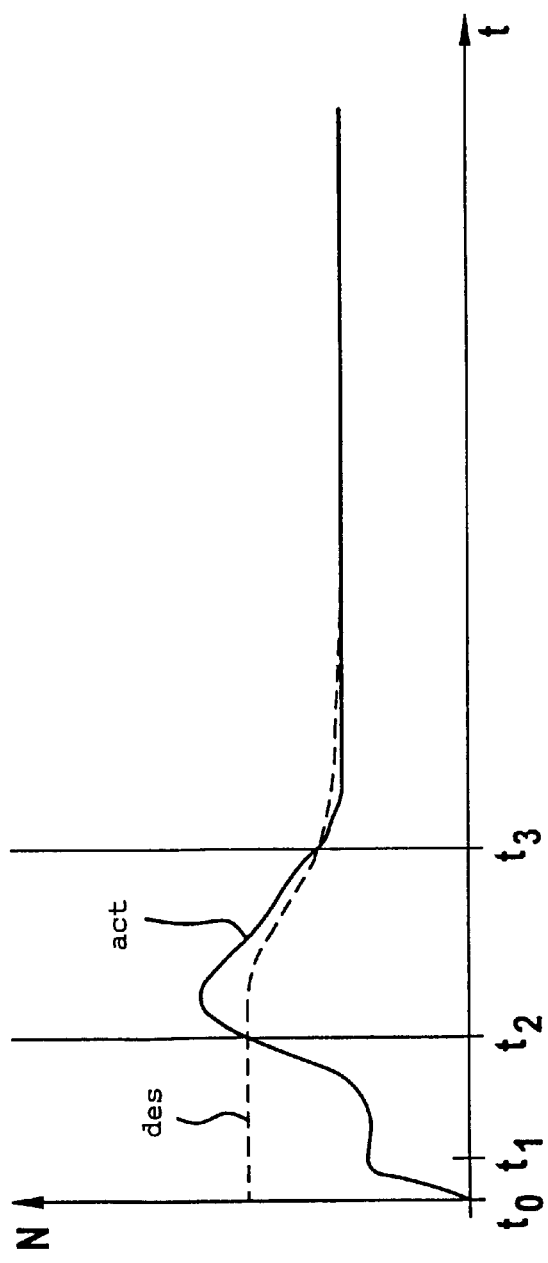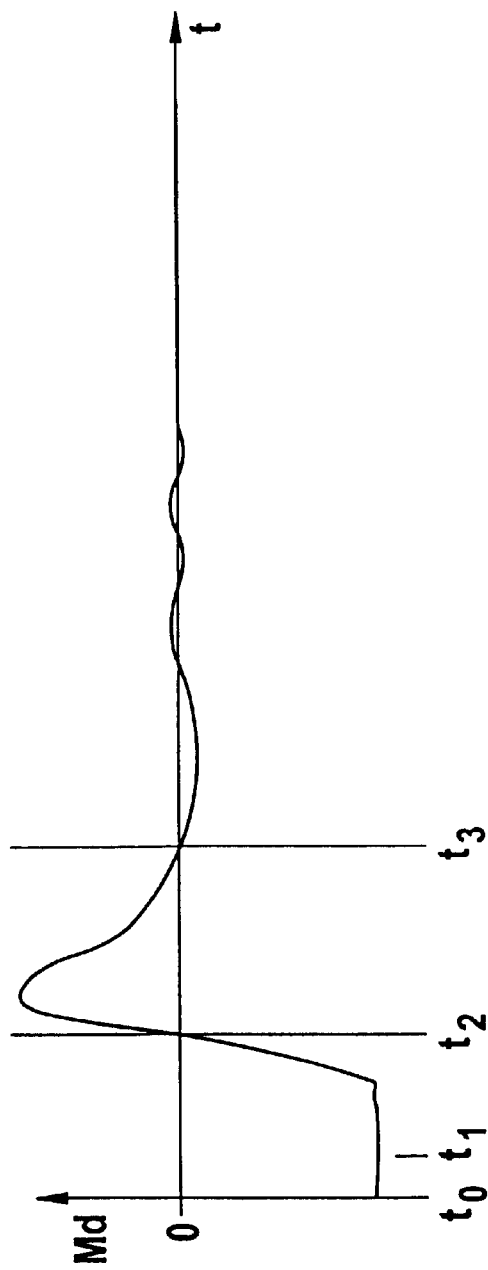

METHOD AND ARRANGEMENT FOR CONTROLLING THE RPM OF A DRIVE UNIT

FIELD OF THE INVENTION

The invention relates to a method and an arrangement for controlling the rpm of a drive unit.

BACKGROUND OF THE INVENTION

The course of the rpm is an important criterion especially during the start of a drive unit. The objective is to obtain a highest possible gradient when running up the motor and achieve a defined, reproducible overshoot of the rpm beyond the steady-state desired rpm for a uniform transient effect into the idle range. For this reason, measures are taken during the start phase which produce such a desired rpm behavior. This applies also to internal combustion engines wherein, as a rule, this is undertaken by controlling the air supply to predetermined start values and by controlling (open loop and/or closed loop) the rpm in accordance with the desired rpm trace by shifting the ignition angle. An example of such a procedure is provided in German patent publication 199 39 821. Because of the influencing of the ignition angle to form this rpm course, the ignition angle cannot be set to its optimal value (for example, with respect to the heating of a catalytic converter). Furthermore, such functions must also be considered in the start phase so that the flexibility for controlling the course of the rpm is limited. Additionally, the control of the rpm course is made more difficult by disturbing quantities which are superposed by the on and off switching of additional consumers such as a rear window heating, servo pump, et cetera and can considerably affect the course of the rpm.

A procedure is known from German patent publication 198 42 496 wherein an electric machine (starter generator) is mounted in the region of the drive train. With the actuation of the electric machine, an internal combustion engine can be influenced with respect to the rpm by the power output or the power take-up of the electric machine. In the known solution, this effect of the electric machine is utilized to adjust the synchronous rpm when shifting the vehicle transmission.

A torque-based control system for an internal combustion engine is presented in German patent publication 197 39 567. Here, a desired torque value is formed by coordinating different torque requests. In the above-mentioned embodiment, the desired torque value is converted into a desired torque value for the air path and a desired torque value for the more rapid crankshaft synchronous path (for example, ignition angle). The torque change requests (at least the dynamic portions of additional functions such as an idle control) are superposed on the last-mentioned desired torque value. In one embodiment, the resulting desired torque value is realized by shifting the ignition angle.

SUMMARY OF THE INVENTION

A satisfactory configuration of the rpm course is achieved by driving an electric machine (starter generator) in the start of the internal combustion engine. The electric machine influences the rpm of an internal combustion engine by taking up power and by outputting power. It is especially advantageous that air supply and ignition angle setting are adjusted uninfluenced by the rpm control exclusively in accordance with exhaust gas considerations especially of an effective heating of a catalytic converter.

The dead time of the system is reduced in an especially advantageous manner by the rapid intervention via the electric machine. In this way, the desired rpm course is better maintained which increases reproducibility and is therefore advantageous also with respect to comfort for the driver.

In an advantageous manner, the control parameters of the internal combustion engine, namely ignition and charge, are designed for a reliable starting performance of the thermal reaction heating of the catalytic converter; whereas, the electric machine takes up excessive torque in the start phase or supplies missing torque to maintain the desired rpm course.

In an especially advantageous manner, unpredictable disturbance quantities such as the on or off switching of a rear window heater or a servo pump are rapidly compensated by corresponding control of the electric machine and via its positive torque. The rear window heating or a servo pump today lead to noticeable drops in rpm.

In an advantageous manner, the request for torque by the electric machine is formed on the basis of the deviation between a pregiven desired torque and the actual torque. In this way, and in an advantageous manner, the intervention of the electric machine in the sense of increasing torque or reducing torque is considered in the torque orientated control structure of an internal combustion engine.

BRIEF DESCRIPTION OF THE DRAWINGS

The invention will now be described with reference to the drawings wherein:

FIG. 3a is a graph showing the desired rpm and actual rpm plotted as a function of time; and, FIG. 3b is a graph showing the starter generator torque plotted as a function of time.

DESCRIPTION OF THE PREFERRED EMBODIMENTS OF THE INVENTION

Figure 1:
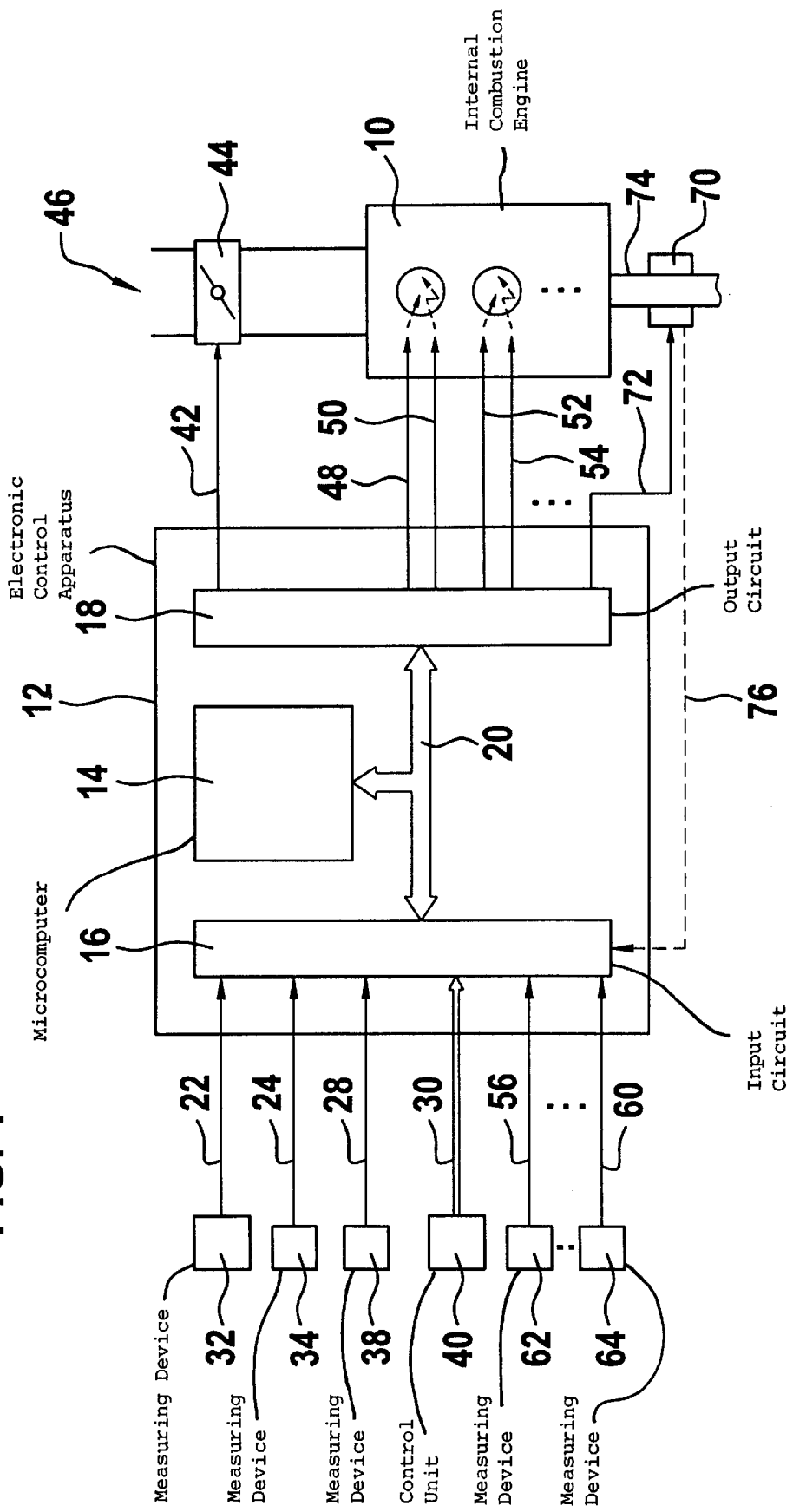
FIG. 1 is an overview block diagram of a control unit which controls an internal combustion engine and an electric machine. The electric machine is so mounted that it can supply torque to the engine or can take up torque from the engine during a braking operation.

FIG. 1 shows a control arrangement for a multi-cylinder internal combustion engine 10. The control arrangement includes an electronic control apparatus 12 which includes at least one microcomputer 14, an input circuit 16, and an output circuit 18. Input circuit 16, output circuit 18, and microcomputer 14 are interconnected via a communications bus 20 for the mutual exchange of data. Input lines 22, 24, 28, 30 and 56 to 60 as well as additional input line 76 all lead to the input unit 16. The line 22 originates at a measuring device 32 for detecting the accelerator pedal position and the line 24 comes from the measuring device 34 for detecting the engine rpm and the line 28 originates from a measuring device 38 for detecting a quantity representing the engine load. In the preferred embodiment, the line 30 represents a communications bus from at least a further control unit 40 for at least one of the following: a drive slip control, a transmission control and an engine drag torque control. Depending upon the embodiment, to detect the quantity representing the engine load, air mass sensors, air quantity sensors or pressure sensors are provided for detecting the intake manifold pressure or the combustion chamber pressure. The input lines 56 to 60 originate from measuring devices 62 to 64 via which additional quantities of the drive unit and/or of the vehicle are supplied such as engine temperature, road speed, signals from knock sensors, et cetera. A quantity (for example, current) is supplied from an electric machine 70 via the input line 76. This quantity represents the torque take-up of the electric machine 70 or the torque output thereof.

An output line 42 is connected to the output unit 18 and leads to an electrically actuable throttle flap 44 which is mounted in the air intake system 46 of the internal combustion engine. Furthermore, output lines 48, 50, 52, 54, et cetera are shown, which are connected to actuating devices for fuel metering in each cylinder of the engine 10 or function to adjust the ignition angle in each cylinder. In addition, a controllable electric machine 70 (for example, a starter generator) is provided which is driven by the control unit 12 via the output circuit 18 and the output line 72 shown. The electric machine 70 is connected to the engine 10 and especially to the output shaft 74 thereof so that it can supply additional torque by acceleratingly driving the elecric machine or take up additional torque by brakingly driving the electric machine. An example of such an arrangement is known from the state of the art referred to initially herein.

The control of the engine as well as of the electric machine takes place in the context of programs which are implemented in the computer unit 14. In the preferred embodiment, a torque orientated motor control is realized by these programs, such as in the state of the art. This means that a driver command desired torque is pregiven on the basis of the driver command (accelerator pedal position) as well as additional operating quantities if required. This driver command desired torque is coordinated with other desired torque values which originate, for example, from other control units or from internal functions of the control units. A resultant desired torque is generated which is adjusted by adjusting the air supply to the engine and/or by adjusting the ignition angle or the fuel mass. External functions include, for example, drive slip controls, stability programs, transmission controls, et cetera; whereas, internal functions include, for example, rpm limiting, torque limiting or roadspeed limiting. If required, the output signals of additional functions (such as an idle controller or an antibucking control) are superposed (for example, added) onto the resulting desired torque value. These functions require also a dynamic rapid change of the torque. For this reason, the dynamic component is superposed on the desired torque for the crankshaft synchronous path. The resulting desired torque, which is, if required, increased or lowered by additional components, is then converted into a pregiven ignition angle and/or a fuel metering setting. The static component is added to the driver command torque which is then converted into a corresponding adjustment of the air supply.

An electric machine such as a starter generator is mounted in the vehicle in such a manner that it can apply torque to the engine. With this electric machine, a further degree of freedom for controlling the vehicle is made available. This further degree of freedom is utilized hereinafter in the context of a start phase to form the course of the rpm. Driving the starter generator takes place in such a manner that there is a control to a defined pregiven rpm course when the engine is started. The starter generator drags the engine up to its self-running in the sense of a starter, that is, up to a pregiven rpm threshold such as 300 rpm. Thereafter, the control unit controls the starter generator so that the pregiven rpm course is maintained by positive (driving) and/or negative (braking) torques on the engine by the starter generator. The control unit forms the difference between the pregiven desired rpm course and the measured actual rpm of the engine. If the desired rpm is below the actual rpm, then the starter generator is driven in a braking operation in order to reduce the rpm of the engine by the additional superposition of torque thereon. If the actual rpm is below the desired rpm, then the starter generator is so driven that it outputs torque to the engine and, in this way, increases the rpm. In one embodiment, asynchronous machines or permanently excited synchronous machines have been shown to be suitable with the view to the required rapidity of the intervention of the electric machine and the wanted reduction of the dead time.

During the starting phase, the parameters ignition, fuel mass and charge (air) of the engine are adjusted so as to be optimal with respect to exhaust gas, especially in such a manner that a reliable starting performance of the thermal reaction for heating the catalytic converter takes place.

Depending upon the embodiment, the starter generator control is switched off with the conclusion of the starting phase when the rpm has settled down to the idle desired rpm. Or, in another embodiment, the starter generator control is continued during the idle rpm control. The steady-state component of the idle rpm controller (for example, the I component) operates, as previously, on the steady-state torque adjustment via the air supply or determination of the fuel mass; whereas, the dynamic components (for example, the P component and/or the D component) correct the torque of the engine via the electric machine in dependence upon control deviation. The use of an idle rpm control component, which influences the ignition and/or the fuel supply, is then superfluous.

With a view to the torque orientated control structure of the internal combustion engine, there then results an inclusion of the positive or negative torque, which is requested by the starter generator, corresponding to the inclusion of the dynamic output of the idle control by superposing the value onto the desired torque for the crankshaft synchronous path.

Figure 2:
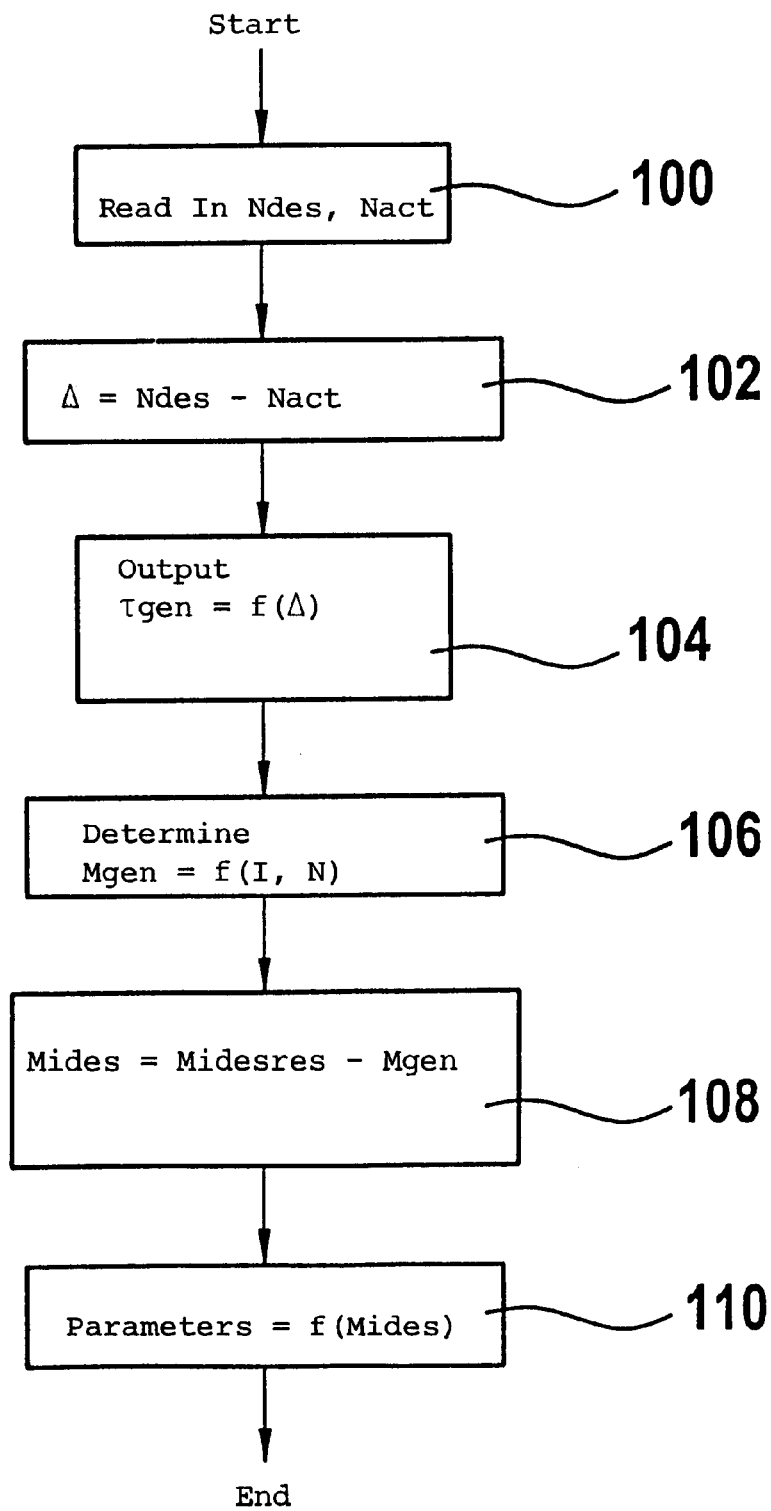
FIG. 2 shows a flowchart presenting a preferred embodiment for influencing the electric machine to form the rpm course during the start phase.

A preferred embodiment of the described procedure is shown in FIG. 2 with respect to a flowchart which represents a preferred embodiment of the described procedure as a program of the computer unit of the control unit 10. The program is run through in predetermined time intervals after the rpm is exceeded up to the end of the start phase and/or during the entire operating cycle of the vehicle.

In the first step 100, the desired rpm Ndes and the actual rpm Nact are read in. In the start phase, the desired rpm is pregiven as a time interval in dependence upon the time elapsed since the actuation of the starter generator or the starter and, after ending the start phase, the desired rpm is pregiven in dependence upon operating quantities such as engine temperature, road speed, rpm, et cetera. In the next step 102, the control deviation Δ is formed in accordance with the deviation between the desired and actual values and especially their difference. In the next step 104, the drive signal τgen for the starter generator is formed in dependence upon the control deviation Δ and is outputted to the starter generator controller. The formation of the drive signal in dependence upon the control deviation takes place in accordance with a pregiven control strategy. In view of the dynamic of the intervention, a proportional component and/or a differential component has been shown to be suitable by means of which the control deviation is converted into the drive signal quantity. In a preferred embodiment, the drive signal is a pulsewidth modulated signal controlling the current or the voltage of the electric machine. In the next step 106, the torque Mgen is determined as a function of the engine rpm and/or of the control current or the control voltage. The torque Mgen is requested by the drive signal for the starter generator. This torque can be positive or negative depending upon whether the electric machine is driven or is braked. In the next step 108, the desired torque value Mides is determined by superposing the determined starter generator torque Mgen onto the resulting desired torque Midesres. Here, it is noted that positive starter generator torques are subtracted from the resulting desired torque and that negative starter generator torques are added to the resulting desired torque. In the next step 110, the parameters, which are to be controlled, are determined in accordance with the desired torque Mides, which, if required, is corrected by further quantities. The desired torque Mides is formed in step 108 and the parameters to be controlled are, for example, the ignition angle or the fuel mass. Thereafter, the program is ended and is run through again at the next interval.

The procedure described above is shown by the time diagrams of FIGS. 3a and 3b. FIG. 3a is a plot of the desired rpm DES and the actual rpm ACT as a function of time; whereas, FIG. 3b shows the starter generator torque plotted as a function of time. In FIG. 3b, the driving torque is shown below the zero line and the braking torque is shown thereabove. At time point T0, the driver actuates the ignition switch for starting the engine. In this case, the starter generator functions as a starter. At time point T1, the self-running rpm threshold of the engine is exceeded. Thereafter, the starter generator is driven in the context of the deviation between the desired rpm (shown by the broken line in FIG. 3a) and the actual rpm. At first, a large control deviation is present after the time point T1 so that the starter generator outputs a large driving torque. Because of the steep rpm increase up to time point T2, the control deviation between the actual rpm and the desired rpm is considerably reduced by the driving torque of the starter generator as well as by the torque generation of the engine so that the driving torque of the starter generator becomes less. At time point T2, the actual rpm is equal to the desired rpm so that the starter generator torque is zero, that is, neither driving nor braking. After time point T2, the actual rpm exceeds the desired rpm in the context of the rpm overshoot so that a negative rpm deviation occurs. The starter generator is thereby switched over into the braking operation and, after time point T2 until time point T3, generates a braking torque dependent upon the deviation between the desired rpm and the actual rpm. At time point T3, the actual rpm again drops below the desired rpm so that a driving torque is required to bring the actual rpm to the desired rpm. After switchover, the starter generator generates only a low driving torque during driving operation as a consequence of the low control deviation. As a consequence, the rpm swings into the desired rpm value.

It is understood that the foregoing description is that of the preferred embodiments of the invention and that various changes and modifications may be made thereto without departing from the spirit and scope of the invention as defined in the appended claims.

What is claimed is:

1. A method for controlling the rpm of a drive unit, the method comprising the steps of:

inputting a desired rpm for an internal combustion engine;

detecting an actual rpm;

forming at least one output signal for controlling said engine;

forming an output signal for controlling an electric machine which applies a torque to said engine; and, during the start phase of the engine, driving said electric machine in dependence upon the deviation between said desired rpm and the actual rpm of said engine.

2. The method of claim 1, comprising the further steps of:

operating said electric machine during a braking operation or during a drive operation;

taking up torque from said drive unit during drive operation; and, for an rpm below said desired rpm, operating said electric machine in drive operation and, for an actual rpm above said desired rpm, operating said electric machine in braking operation.

3. The method of claim 1, wherein said electric machine is a starter generator.

4. The method of claim 1, comprising the further step of driving said electric machine in dependence upon the rpm after ending the starting operation.

5. The method of claim 1, comprising the further steps of:

inputting a desired torque value for controlling said internal combustion engine;

converting said desired torque value into an actuating quantity for controlling said internal combustion engine; and, superposing the torque introduced or consumed by said electric machine onto the desired torque.

6. The method of claim 5, wherein said actuating quantity is at least one of the ignition angle and the fuel mass.

7. The method of claim 6, wherein a braking torque of said electric machine is added to the desired torque and a driving torque is subtracted from the desired torque.

8. The method of claim 1, wherein the rpm-dependent drive of the electric machine takes place also outside of the start phase.

9. The method of claim 1, wherein the rpm-dependent drive of the electric machine takes place in the idle state of the engine.

10. The method of claim 9, wherein the idle control is substantially replaced via the ignition angle.

11. The method of claim 1, wherein the charge and/or ignition control is adjusted for optimal exhaust gas independent of said deviation.

12. A method for controlling the rpm of a drive unit, the method comprising the steps of:

inputting a desired rpm for an internal combustion engine;

detecting an actual rpm;

forming at least one output signal for controlling said engine;

forming an output signal for controlling an electric machine which applies a torque to said engine;

providing an idle rpm controller for the rpm of said internal combustion engine with said rpm controller having at least a steady-state component and at least a dynamic component;

causing said components to generate output signals in dependence upon the deviation between desired rpm and actual rpm; and, causing the output signal of said steady-state component to act upon the air supply or the fuel mass to be injected for steady-state torque adjustment while causing the output signal of said dynamic component to operate on the torque of said electric machine.

13. An arrangement for controlling the rpm of a drive unit, the arrangement comprising:

a control unit including:
    means for detecting the rpm of an internal combustion engine;
    means for forming a desired rpm;
    means for generating output signals for controlling at least an actuating variable of said internal combustion engine and an electric machine which applies a torque to said engine; and,
    means for driving said electric machine during the starting phase of said engine in dependence upon the deviation between said desired rpm and the actual rpm.

14. An arrangement for controlling the rpm of a drive unit, the arrangement comprising a control unit including:
    means for outputting a desired rpm for an internal combustion engine;
    means for detecting an actual rpm;
    means for forming at least an output signal for controlling said engine and an output signal for controlling an electric machine which applies a torque to said engine;
    an idle rpm controller for the rpm of said engine;
    said idle rpm controller including at least a steady-state component and at least a dynamic component;
    said steady-state component including means for generating a first output signal in dependence upon a deviation between said desired rpm and the actual rpm;
    said dynamic component including means for generating a second output signal in dependence upon said deviation between said desired rpm and the actual rpm;
    means for applying said first signal to the air supply or to the fuel mass to be injected; and,
    means for causing said second output signal to operate on the torque of said electric machine.

* * * * *